US008606935B2

(12) United States Patent
Nakagawa et al.

(10) Patent No.: US 8,606,935 B2
(45) Date of Patent: Dec. 10, 2013

(54) APPLICATION DISTRIBUTION CONTROL SYSTEM, APPLICATION DISTRIBUTION CONTROL METHOD, INFORMATION PROCESSING APPARATUS, AND CLIENT TERMINAL

(75) Inventors: Kazushi Nakagawa, Fujisawa (JP); Takatoshi Kato, Yokohama (JP); Hiromi Isokawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 595 days.

(21) Appl. No.: 12/396,157

(22) Filed: Mar. 2, 2009

(65) Prior Publication Data

US 2009/0287831 A1 Nov. 19, 2009

(30) Foreign Application Priority Data

May 15, 2008 (JP) .................................. 2008-128738

(51) Int. Cl.
*G06F 15/16* (2006.01)
(52) U.S. Cl.
USPC ............ 709/228; 709/203; 709/223; 709/224
(58) Field of Classification Search
USPC .......................................................... 709/228
See application file for complete search history.

(56) References Cited

U.S. PATENT DOCUMENTS

| 6,711,620 | B1* | 3/2004 | Yoshii et al. | 709/229 |
| 2005/0256923 | A1* | 11/2005 | Adachi | 709/203 |
| 2009/0063690 | A1* | 3/2009 | Verthein et al. | 709/228 |
| 2009/0204694 | A1* | 8/2009 | Kaneko | 709/223 |
| 2009/0248869 | A1* | 10/2009 | Ghostine | 709/225 |
| 2010/0070566 | A1* | 3/2010 | Vandewalle | 709/203 |
| 2010/0198730 | A1* | 8/2010 | Ahmed et al. | 705/50 |

FOREIGN PATENT DOCUMENTS

JP 2004-094411 3/2004

* cited by examiner

*Primary Examiner* — Waseem Ashraf
(74) *Attorney, Agent, or Firm* — McDermott Will & Emery LLP

(57) ABSTRACT

An application distribution control system is made up of an information processing apparatus including a data collecting part that collects and stores data of a use state when using an application of an application distribution server into a memory and a data moving part that moves the use state data to a client terminal; the client terminal including a data setting part that receives the use state data from the information processing apparatus to set a use state of the application in accordance with the use state data and a request transmitting part that transmits a use request for the application to the application distribution server; and the application distribution server including a service providing part that receives the use request for the application from the client terminal to allow for the use of the application through the network.

6 Claims, 9 Drawing Sheets

SYSTEM CONFIGURATION CORRESPONDING TO VIRTUAL LAN

125

| # | ITEM |
|---|---|
| 1 | BROWSER WINDOW SIZE — 41 |
| 2 | COOKIE INFORMATION — 42 |
| 3 | PROXY SERVER ADDRESS — 43 |
| 4 | TAB STATE INFORMATION — 44 |
| 5 | BOOKMARK — 45 |
| 6 | URL HISTORY — 46 |
| 7 | CACHE DATA — 47 |

USE STATE DATA

| # | ITEM |
|---|---|
| 1 | ACCESS PERMITTED/INHIBITED SERVER LIST — 51 |
| 2 | DATA SAVE AVAILABILITY — 52 |
| 3 | EXTERNAL STORAGE DEVICE AVAILABILITY — 53 |
| 4 | INHIBITED BROWSER LIST — 54 |
| 5 | ANTIVIRUS SOFTWARE COMPATIBILITY — 55 |
| 6 | BROWSER BACKGROUND COLOR CHANGE PROPRIETY — 56 |

SECURITY POLICY DATA

| # | USER ID (61) | AVAILABLE SERVICE (62) | AUTHENTICATION INFORMATION (63) |
|---|---|---|---|
| 1 | USER A | AVAILABLE SERVICE 1 | USER ID 1 |
|   |   |   | PASSWORD 1 |
|   |   |   | ELECTRONIC CERTIFICATE 1 |
|   |   |   | BIOMETRIC CERTIFICATE INFORMATION 1 |
|   |   | AVAILABLE SERVICE 2 | USER ID 2 |
|   |   |   | PASSWORD 2 |
|   |   |   | ELECTRONIC CERTIFICATE 2 |
|   |   |   | BIOMETRIC CERTIFICATE INFORMATION 2 |
| 2 | USER B | AVAILABLE SERVICE 1 | USER ID 1 |
|   |   |   | PASSWORD 1 |
|   |   |   | ELECTRONIC CERTIFICATE 1 |
|   |   |   | BIOMETRIC CERTIFICATE INFORMATION 1 |
| ⋮ | ⋮ | ⋮ | ⋮ |
| N | USER N | AVAILABLE SERVICE N |   |

AUTHENTICATION INFORMATION

FIG. 5C

APPLICATION DISTRIBUTION CONTROL SYSTEM, APPLICATION DISTRIBUTION CONTROL METHOD, INFORMATION PROCESSING APPARATUS, AND CLIENT TERMINAL

CROSS-REFERENCE TO RELATED APPLICATIONS

The present application claims a priority from Japanese Patent Application No. 2008-128738 filed on May 15, 2008, the content of which herein incorporated by reference.

BACKGROUND

The present invention relates to an application distribution control system, and application distribution control method, an information processing apparatus, and a client terminal and, specifically, to a technology that enables improvement of operating efficiency for users, etc., by reducing network loads and avoiding load concentration on a server due to a screen transfer mode in server-based computing.

Software such as CRM (Customer Relationship Management), collaboration tool, and ERP (Enterprise Resource Planning) package becomes more important in corporate information systems and is incorporated in many companies. Such software is often conventionally operated by a company's IT department having everything from hardware to applications. Therefore, introducing software requires a lot of time and effort for consideration of specifications, purchase, establishment, operation, etc.

On the other hand, recently, software service in the forms called SaaS (Software as a Service) and ASP (Application Service Provider) is becoming widely used. If SaaS and ASP are utilized, software functions provided by an external vender are utilized via a network to outsource a portion of company's information system functions. Utilization of SaaS and ASP allows a company to quickly use necessary software services when needed and to hold down the initial investment cost and the operation cost. It is also advantageous in that a company does not have to possess servers and software as asset.

On the other hand, the performance of PC is further enhanced as utilization of PC in company's general business operation is expanded. As the performance is enhanced, a frequency of replacement of PC lent to company's employees is further increased, requiring more investments. As the number of employees increases, it becomes extremely difficult to integrally manage version-up, bug fixing, antivirus activity, backup, etc., of OS (operating System) and business applications of individual PC.

One technique for reducing the management costs is introduced as a system operation mode called a server-based computing mode (or client-server mode). This mode includes accumulating main programs and data in a server to reduce data accumulated in clients such as thin clients, for example (see e.g., Japanese Patent Application Laid-Open Publication No. 2004-094411). Since calculation processes and data accumulation are mainly performed by a server, the server-based computing mode reduces the necessity and the frequency for performing version-up, bug fixing, antivirus activity or virus elimination, etc., of OS and applications utilized in business operations individually in clients such as thin clients, and overall management costs may be reduced. Since hardware may be replaced only on the server side, the reduction of costs may be achieved.

SUMMARY OF THE INVENTION

In the above server-based computing mode, data and processing abilities are mainly deployed on a server and client remotely controls the server through a network. In a particular implementation of the server-based computing modes, which is called a screen transfer mode, a client transmits user input information from a mouse, a keyboard, etc., to a server while the server sends back screen information of a data processing result.

Since a large amount of screen information is generally sent back from the server to the client by OS (Operating System) having GUI (Graphical User Interface), a user response tends to deteriorates in the case of a network having a narrow bandwidth, resulting in reduction in usability. Since the processing ability depends on the server, it is problematic that loads are concentrated on the server, causing deterioration of responses.

If SaaS and ASP (provided by another company) on the Internet are utilized, a provided user authentication function depends on the system thereof considered as a black box and, therefore, it is problematic that the company's security policy may not necessarily be satisfied.

The present invention was conceived in view of the above problems and provides a technology that enables improvement of operating efficiency for users, etc., by reducing network loads and avoiding load concentration on a server due to a screen transfer mode in server-based computing.

According to a first aspect of the disclosed system there is provided an application distribution control system comprising a client terminal; an information processing apparatus that makes up a thin client system with the client terminal; and an application distribution server that allows another apparatus to use an application through a network, the information processing apparatus including a data collecting part that collects and stores data of a use state of the application in the information processing apparatus into a memory, the use state being a state at which the application in the application distribution server is used from the information processing apparatus; and a data moving part that reads and moves the use state data from the memory to the client terminal through the network, the client terminal including a data setting part that receives the use state data from the information processing apparatus to set a use state of the application in the client terminal in accordance with the use state data and a request transmitting part that transmits a use request for the application to the application distribution server through the network, the application distribution server including a service providing part that receives the use request for the application from the client terminal via the network to allow the client terminal to use the application through the network.

In the application distribution control system, the data collecting part of the information processing apparatus collects, as the use state data, from a storage device of the information processing apparatus, at least one of a window size, a cookie, a proxy server address, a tab state, a bookmark, a URL history, and cache data of a browser used when the application in the application distribution server is used from the information processing apparatus. The data setting part of the client terminal receives the use state data from the information processing apparatus to set, as setting of the use state of the application in the client terminal, at least one of a window size, a cookie, a proxy server address, a tab state, a bookmark, a URL history, and cache data of a browser included in the client terminal in accordance with the use state data.

In the application distribution control system, the data collecting part of the information processing apparatus may read and store authentication information from a storage device of the information processing apparatus into a memory, the authentication information being used when the application in the application distribution server is used from the information processing apparatus. The data moving part of the information processing apparatus may read and move the authentication information from the memory to the client terminal through the network. The request transmitting part of the client terminal may receive the authentication information from the information processing apparatus, transmit an authentication request containing the authentication information to the application distribution server, receive an authentication result from the application distribution server depending on the authentication request, and transmit the use request for the application if the authentication result indicates successful authentication. The service providing part of the application distribution server may receive the authentication request from the client terminal, execute an authentication process by checking the authentication information contained in the authentication request against authentication data in the storage device to generate an authentication result, and transmit the authentication result to the client terminal.

In the application distribution control system, the data collecting part of the information processing apparatus may read and store security policy data from a storage device of the information processing apparatus into a memory, the security policy data being used when the application in the application distribution server is used from the information processing apparatus. The data moving part of the information processing apparatus may read and move the security policy data from the memory to the client terminal through the network. The data setting part of the client terminal may receive and store the security policy data from the information processing apparatus into the storage device. The request transmitting part of the client terminal may read the security policy data from the storage device, determine whether the application distribution server is prescribed in the security policy data, and transmit the use request for the application to the application distribution server prescribed in the security policy data.

For example, the security policy prescribes a basic policy about information security in a certain organization and includes security action criteria, individual specific practical procedures, etc. An example of the prescriptions may be assumed to be prescriptions for preventing use of information for purposes other than the original intent, outside intrusion, leakage of confidential information, etc., such as who (or which computer) is allowed to read what information, who (or which computer) is permitted to execute what operation, and what data are encrypted.

In the application distribution control system, the security policy data may contain information of availability of the storage device of the information processing apparatus from the client terminal. The request transmitting part of the client terminal may read the security policy data from the storage device to determine whether the security policy data prescribe that the storage device of the information processing apparatus is available, transmit a use request for the storage device to the information processing apparatus if the storage device of the information processing apparatus is available, transmit an acquisition request for saved data associated with the use of the application to the application distribution server, and instruct the information processing apparatus to store the saved data acquired from the application distribution server into the storage device. The information processing apparatus may include a mounting part that receives a use request for the storage device from the client terminal to execute setting of use permission for the storage device to the client terminal and that receives a storage instruction for the saved data from the client terminal to store the saved data into the storage device. The service providing part of the application distribution server may receive the acquisition request for the saved data from the client terminal, read the saved data from the storage device, and transmit the saved data to the client terminal through the network.

The setting of the use permission for the storage device to the client terminal performed by the mounting part of the information processing apparatus indicates a so-called "mounting" process. The "mounting" means a process of causing and enabling a computer to recognize and operate storage, etc.

The application distribution control system may comprise a proxy server that relays access from the information processing apparatus or the client terminal to the application distribution server. The proxy server may perform, as a substitute, an authentication procedure necessary for accessing from the information processing apparatus or the client terminal to the application distribution server and maintenance of a session between the information processing apparatus or the client terminal and the application distribution server.

The proxy server is a server apparatus located on the boundary between an internal network of a company, etc., and the Internet to couple to the Internet by "proxy" on behalf of computers in the internal network unable to directly couple to the Internet. The proxy server is used to unify management of accesses for entering/exiting the networks and to permit only certain types of coupling from the inside and block unauthorized accesses from the outside.

According to a second aspect of the disclosed system there is provided application distribution control method executed by a client terminal, an information processing apparatus that makes up a thin client system with the client terminal, and an application distribution server that allows another apparatus to use an application through a network, the method comprising the steps of collecting and storing data of a use state of the application in the information processing apparatus into a memory, by the information processing apparatus, the use state being a state at which an application in the application distribution server is used from the information apparatus; and reading and moving the use state data from the memory to the client terminal through the network, by the information processing apparatus, receiving the use state data from the information processing apparatus to set a use state of the application in the client terminal in accordance with the use state data by the client terminal; and transmitting a use request for the application to the application distribution server through the network, by the client terminal, receiving the use request for the application from the client terminal via the network to allow the client terminal to use the application through the network, by the application distribution server.

According to a third aspect of the disclosed system there is provided an information processing apparatus that makes up a thin client system with a client terminal, comprising a data collecting part that collects and stores data of a use state of the application in the information processing apparatus into a memory, the use state being a state at which an application is used in an application distribution server that allows another apparatus to use the application through a network; and a data moving part that reads and moves the use state data from the memory to the client terminal through the network.

According to a fourth aspect of the disclosed system there is provided a client terminal that makes up a thin client system with an information processing apparatus, comprising a data setting part that acquires data of a use state of the application in the information processing apparatus from the information processing apparatus to set a use state of the application in the client terminal in accordance with the use state data the use state being a state at which an application is used in an application distribution server that allows another apparatus to use the application through a network; a request transmitting part that transmits a use request for the application to the application distribution server through the network; and a service using part that uses the application through the network from the application distribution server.

The above and other problems and solutions thereto disclosed herein will become apparent from the following description of the preferred embodiments of the present invention with reference to the accompanying drawings.

According to the teaching herein, improvement of operating efficiency for users, etc., may be achieved by reducing network loads and avoiding load concentration on a server due to a screen transfer mode in server-based computing.

These and other benefits are described throughout the present specification. A further understanding of the nature and advantages of the invention may be realized by reference to the remaining portions of the specification and the attached drawings.

BRIEF DESCRIPTION OF THE DRAWINGS

FIGS. 5A to 5C are diagrams of exemplary data configurations of use state data (FIG. 5A), security policy data (FIG. 5B), and authentication information (FIG. 5C) according to the embodiment;

DETAILED DESCRIPTION OF THE EMBODIMENTS

System Configuration

Figure 1:
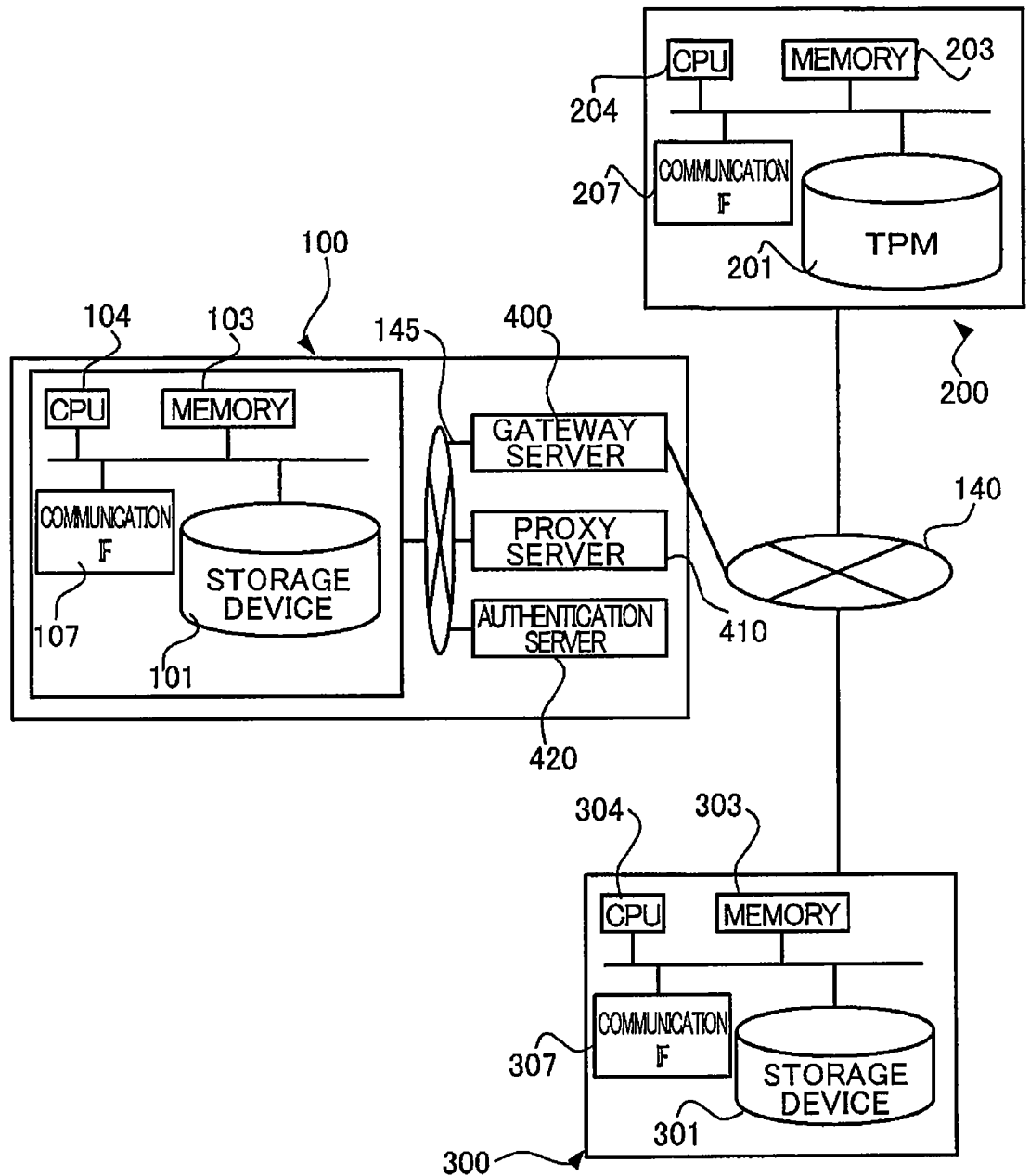
FIG. 1 is a diagram of an exemplary network configuration of an application distribution control system of the embodiment.

An embodiment of the present invention will now be described in detail with reference to the drawings. FIG. 1 depicts a network configuration of an application distribution control system 10 of the embodiment. The application distribution control system 10 of FIG. 1 is a system including a client blade 100 that is an information processing apparatus, a client terminal 200 that remotely controls the client blade 100, and an application distribution server 300 that allows the client blade 100 and the client terminal 200 to use an application through networks, which are coupled to each other over the networks.

The client blade 100 establishes VPN (Virtual private network) with the client terminal 200 to receive and process the input information (operation contents of input devices) sent from the client terminal 1200 and transmit image information indicative of a processing result (desktop screen of a display device) to the client terminal 200. The client blade 100 is a server apparatus normally used without locally coupling input/output devices The networks are assumed to be, for example, an external network 140 such as the Internet, LAN (Local Area Network), and telephone lines and a company network 145. The external network 140 is the external network 140 that couples the client terminal 200, a gateway server 400, and the application distribution server 300 with each other to relay the exchange of data. On the other hand, the company network 145 is a network within a company partitioned from the external network 140 by the gateway server 400 and is coupled with the client blade 100, the gateway server 400, a proxy server 410, an authentication server 420, etc.

The proxy server 410 is a server that relays the coupling from the client blade 100 to the application distribution server 300, and the gateway server 400 is a server located on the boundary between the company network 145 and the external network 140 to function as a firewall. The authentication server 420 is a server unifying the management of the authentication information of users and retains a list of the authentication information such as user ID information and passwords for services in a nonvolatile storage device. The authentication server 420 may request necessary authentication information (user ID and password) from an application requesting an authentication information list of a user to perform control for preventing a user from referring to the authentication information list of another user.

Figure 2:
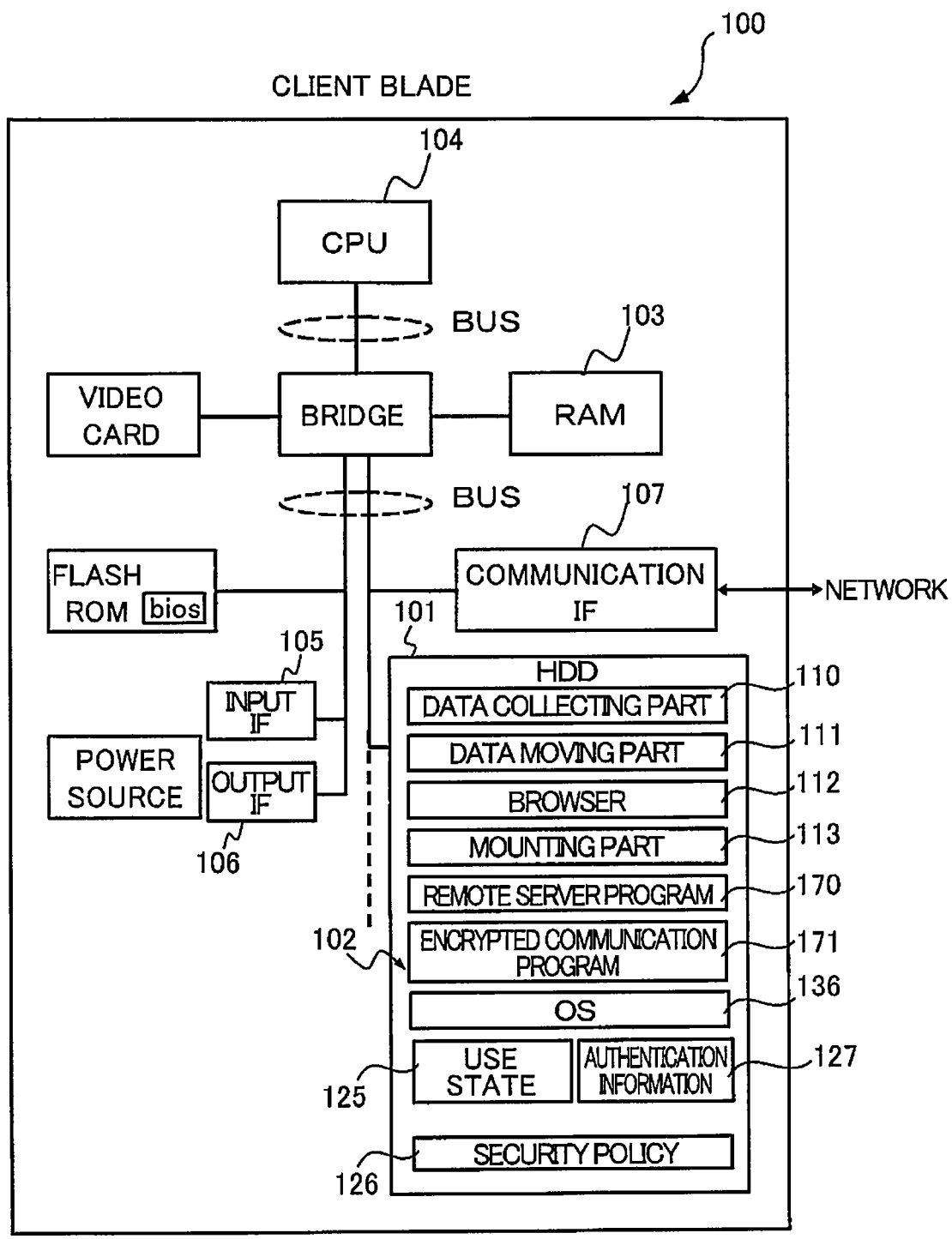
FIG. 2 is a diagram of an exemplary configuration of the client blade of the embodiment.

The apparatuses making up the application distribution control system 10 according to the embodiment will then be described. FIG. 2 depicts an exemplary configuration of the client blade 100 that is an information processing apparatus of the embodiment. The client blade 100 is a server apparatus that is an information processing apparatus accepting a remote access from the client terminal 200 to make up a thin-client system. The client blade 100 reads out a program 102 stored in HDD (hard disc drive) 101, CF (Compact Flash), etc., to be equipped with the functions for implementing the present invention onto a RAM 103 and executes the program with a CPU 104 that is a computing device.

The client blade 100 includes an input interface 105 such as various keyboards and buttons generally included in a computer apparatus, an output interface 106 such as a display if needed, and a communication interface 107 responsible for giving/receiving data to/from the application distribution server 300, the client terminal 200, etc.

Functional units configured/retained by the client blade 100 based on, for example, the program 102 will be described. The client blade 100 includes a data collecting part 110 that collects and stores into the RAM 103 the data of application use state in the client blade 100 when the application in the application distribution server 300 is used from the client blade 100.

The data collecting part 110 may collect the use state data from the storage device 101 of the client blade 100 as at least one of a window size, a cookie, a proxy server address, a tab state, a bookmark, a URL history, and cache data of a browser 112 used when the application in the application distribution server 300 is used from the client blade 100. The data collecting part 110 may read and store from the storage device 101 of the client blade 100 into the RAM 103 the authentication information used when the application in the application distribution server 300 is used from the client blade 100. The data collecting part 110 may read and store from the storage device 101 of the client blade 100 into the RAM 103 the data of security policy when the application in the application distribution server 300 is used from the client blade 100.

The client blade 100 includes a data moving part 111 that reads and moves the use state data from the RAM 103 to the client terminal 200 through the external network 140. The data moving part 111 may read and move the authentication information from the RAM 103 to the client terminal 200 through the external network 140. The data moving part 111 may read and move the security policy data from the RAM 103 to the client terminal 200 through the external network 140.

The client blade 100 includes a mounting part 113 that receives a use request for the storage device 101 from the client terminal 200 to execute setting of use permission for the storage device 101 to the client terminal 200 and that receives a storage instruction for the saved data from the client terminal 200 to store the saved data into the storage device 101. The setting of the use permission for the storage device 101 to the client terminal 200 performed by the mounting part 113 indicates a so-called "mounting" process. The "mounting" means a process of causing and enabling a computer to recognize and operate a storage, etc.

The browser 112 is an application program for coupling to the application distributing server 300 to receive the application distribution and is read into the RAM 103 and executed by the CPU 104. A "browser" is generally an application for browsing web pages and is an application that performs download, layout analysis, and display of structured texts called HTML (HyperText Markup Language), image files, etc., from a server. The browser 112 according to the embodiment refers to general applications interacting with the application distribution server 300 through the external network 140 to provide a service to the client blade 100 and, for example, RIA (Rich Internet Application), etc., are included in kinds of the browser 112. The RIA is an internet application that uses technologies such as Ajax and Flash (registered trademarks) to enhance operability and expressiveness as compared to the HTML display of conventional browsers. The RIA enables user-friendly content display using animation, etc., and is generally characterized by generating no screen transition and having excellent operability to enable intuitive operations such as drag and drop.

The client blade 100 stores a remote server program 170, an encrypted communication program 171, and OS (Operating System) 136 in the HDD 101. The OS 136 is a program for the CPU 104 generally controlling the units 101 to 130 of the client blade 100 to execute the programs implementing the functional units such as the part 110 to 113. The CPU 104 loads the OS 136 from the HDD 101 to the RAM 103 for execution.

The remote server program 170 is a program that enables the remote operation of the desktop of the client blade 100 from the client terminal 200 and is, for example, a server program for VNC (Virtual Network Computing) developed by AT&T Laboratories Cambridge. The CPU 104 loads the remote server program 170 from the HDD 101 to the RAM 103 for execution in accordance with the OS 136. This causes the CPU 104 to receive and process the input information (operation contents of the keyboard and the mouse) sent from the client terminal 200 through the external network 140 such as VPN and to transmit the image information (desktop screen of the display) indicative of the process result to the client terminal 200 through the external network 140 such as VPN.

The encrypted communication program 171 is a communication program for establishing the external network 140 such as VPN with the client terminal 200 and is, for example, a communication program using IPsec (Security Architecture for the Internet Protocol). The CPU 104 loads the encrypted communication program 171 from the HDD 101 to the RAM 103 for execution in accordance with the OS 136. This causes the CPU 104 to establish the secure external network 140 such as VPN with the client terminal 200 in accordance with a coupling establishment request for remote control, etc., accepted from the client terminal 200 through the communication interface 107 and to perform communication for remote control with the client terminal 200 through the VPN, etc.

Figure 3:
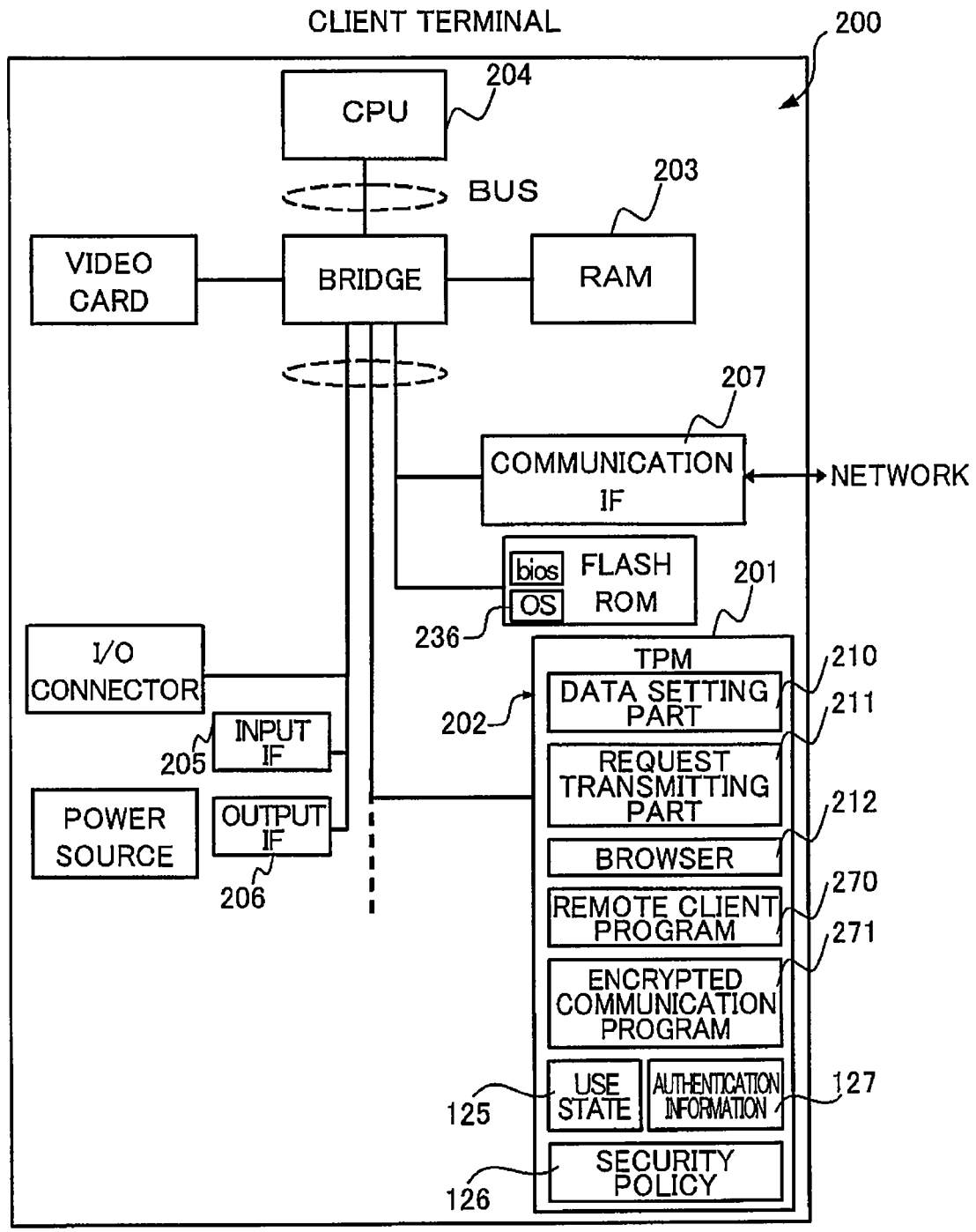
FIG. 3 is a diagram of an exemplary configuration of the client terminal of the embodiment.

The client terminal 200 will then be described. FIG. 3 depicts an exemplary configuration of the client terminal 200 of the embodiment. On the other hand, the client terminal 200 is an apparatus that accesses and remotely controls through the external network 140 the client blade 100 allocated by an appropriate management server and makes up a thin-client system with the client blade 100. The client terminal 200 reads out a program 202 stored in TPM 201, etc., to be equipped with the functions for implementing the present invention onto a RAM 203 and executes the program with a CPU 204 that is a computing device.

The client terminal 200 includes an input interface 205 such as various keyboards and buttons generally included in a computer apparatus, an output interface 206 such as a display, and a communication interface 207 responsible for giving/ receiving data to/from the client blade 100, the application distribution server 300, etc.

The client terminal 200 is a so-called HDD-less PC and is configured to be unable to couple locally or through a network with a printer, an external drive, an external memory, etc. The client terminal 200 is configured to be capable of using only a printer, an external drive, an external memory, etc., couple locally or through a network with the client blade 100. This reduces the possibility of information leakage due to theft of the client terminal 200.

Functional units will then be described that are configured/ retained by the client terminal 200 in the TPM 201 based on the program 202, for example. The client terminal 200 includes a data setting part 210 that receives the use state data from the client blade 100 to set a use state of the application in the client terminal 200 in accordance with the use state data.

The data setting part 210 receives the use state data from the client blade 100 and may set at least one of a window size, a cookie, a proxy server address, a tab state, a bookmark, a URL history, and cache data of a browser 212 included in the client terminal 200 in accordance with the use state data to set the use state of the application in the client terminal 200.

The data setting part 210 may receive and store the security policy data from the client blade 100 into the storage device (e.g., the RAM 203).

The client terminal 200 includes a request transmitting part 211 that transmits a use request for the application to the application distribution server 300 through the external network 140. The request transmitting part 211 may receive the authentication information from the client blade 100 to transmit an authentication request containing this authentication information to the application distribution server 300 and may receive the authentication result from the application distribution server 300 in accordance with the authentication request to transmit the use request for the application if the authentication result indicates successful authentication.

The request transmitting part 211 may read the security policy data from the storage device and may determine whether the application distribution server 300 is prescribed in the security policy data to transmit the use request for the application to the application distribution server 300 prescribed in the security policy data through the external network 140.

The security policy data may contain information of availability of the storage device 101 of the client blade 100 (e.g., a network storage available through a network from the client terminal 200 is assumed) from the client terminal 200. In this case, the request transmitting part 211 may read the security policy data from the storage device 101 to determine whether the security policy data prescribe that the storage device 101 of the client blade 100 is available and if the storage device 101 of the client blade 100 is available, the request transmitting part 211 may transmit a use request for the storage device 101 to the client blade 100, may transmit an acquisition request for saved data associated with the use of the application to the application distribution server 300, and may instruct the client blade 100 to store the saved data acquired from the application distribution server 300 into the storage device 101.

The browser 212 is an application program coupling to the application distributing server 300 to receive the application distribution and is read into the RAM 203 and executed by the CPU 204 (other descriptions are same as the browser 112).

It may be assumed in this embodiment that the client terminal 200 packages (the programs implementing) the part 210 to 212, a remote client program 270, an encrypted communication program 271, etc., within the chip called TPM (Trusted Platform Module) 201 (of course, if the client terminal 200 is a conventional computer including HDD rather than the HDD-less type, HDD may store the part 210 to 212, the remote client program 270, the encrypted communication program 271, etc.).

The TPM 201 has a function similar to a security chip mounted on smart cards (IC cards) and is a hardware chip having a calculation function using asymmetric keys and tamper resistance for securely storing these keys. The functions of the TPM 201 includes, for example, generation/ storage of RSA (Rivest-Shamir-Adleman Scheme) secret keys, calculation (signature, encryption, decryption) with RSA secret keys, hash operations of SHA-1 (Secure Hash Algorithm 1), retention of platform state information (software measurement values) (PCR) retention of chain of trust of keys, certificates, and credentials, generation of high-quality random numbers, nonvolatile memory, other Opt-ins and I/O, etc.

The TPM has functions of generating/storing/calculating encryption keys (asymmetric keys) as well as functions of securely store and making a notification of the platform state information (software measurement values) in a register PCR (Platform Configuration Registers) within the TPM 201. The latest specification of the TPM 201 has additional functions for locality, delegations (right transfer), etc. The TPM 201 is assumed to physically be attached to a part of the platform (such as a motherboard).

The client terminal 200 in this embodiment includes the remote client program 270 and the encrypted communication program 271 in the TPM 201. The remote client program 270 is a program for the client terminal 200 remotely accessing the desktop of the client blade 100 and is a client (viewer) program of VNC, for example. The CPU 204 loads the remote client program 270 from the TPM 201 to the RAM 203 for execution in accordance with the OS 236. This causes the CPU 204 to transmits the input information of an I/O connector (operation contents of the keyboard and the mouse) to the client blade 100 through the external network 140 such as VPN and to output the image information (desktop screen of the display) sent from the client blade 100 through the external network 140 such as VPN to the input/output interfaces 205, etc., such as a display coupled to a video card.

The encrypted communication program 271 is a communication program for establishing a secure communication network such as VPN with the client blade 100 having an address supplied by the remote client program 270. For example, the program may be assumed to be a communication program using IPsec. The CPU 204 loads the encrypted communication program 271 from the TPM 201 to the RAM 203 for execution in accordance with the OS 236. This causes the CPU 204 to transmits a communication start request to the client blade 100 allocated by the client terminal 200 of the CPU 204 through the communication interface 207 to establish a network such as VPN with the client blade 100 and to perform communication for remote control with the client blade 100 through this VPN.

Figure 4:
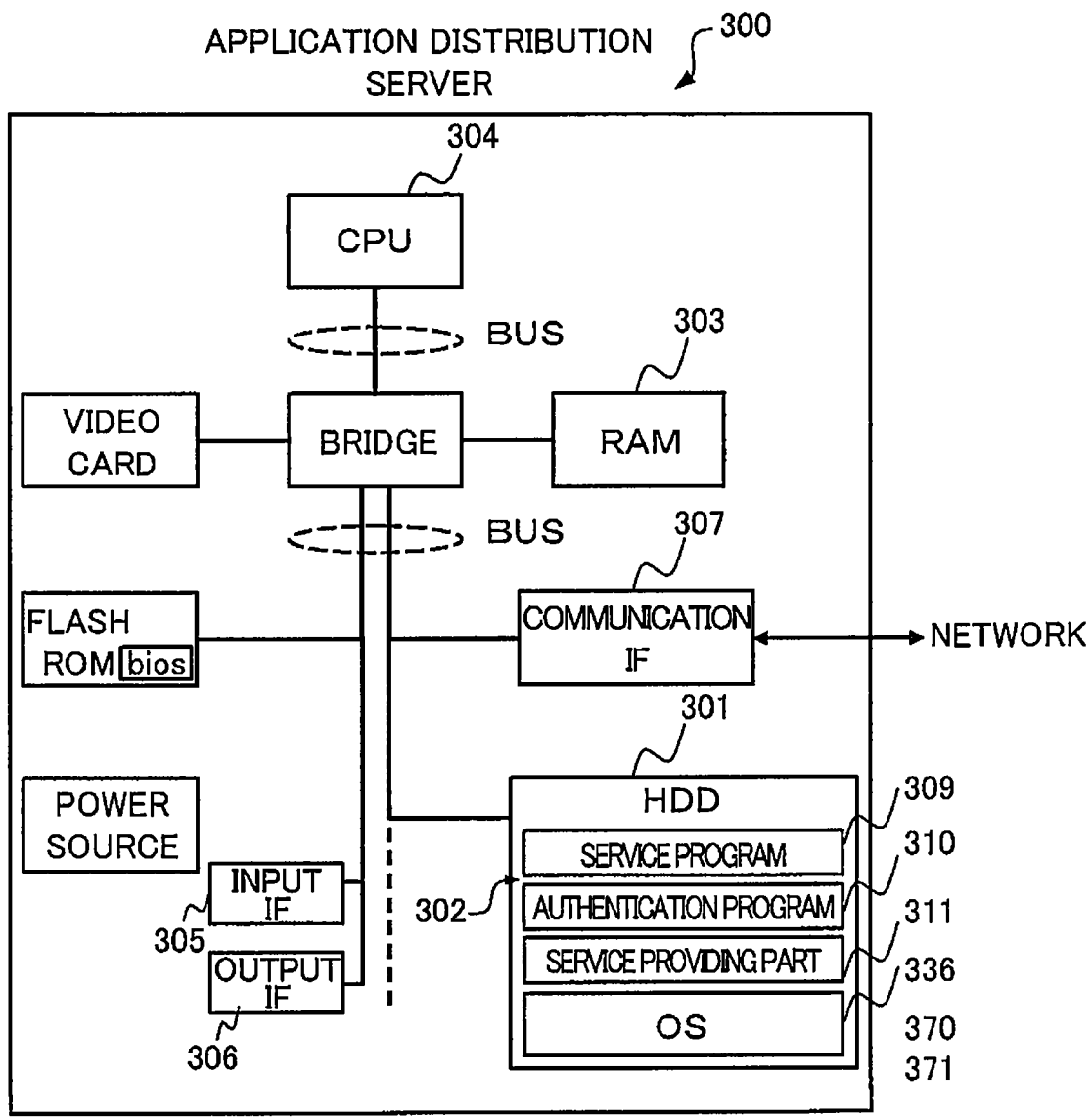
FIG. 4 is a diagram of an exemplary configuration of the application distribution server of the embodiment.

The application distribution server 300 will then be described. FIG. 4 depicts an exemplary configuration of the application distribution server of the embodiment. The application distribution server 300 is a server apparatus that allows other apparatuses, i.e., the client blade 100 and the client terminal 200 to use applications through a network. Specific examples may be assumed to be a server for ASP (Application Service Provider) or SaaS (Software as a Service) Therefore, the application distribution server 300 is assumed to include a service program implementing functions necessary for a server for ASP or SaaS in the nonvolatile storage device 301 such as HDD. The application distribution server 300 includes an authentication program 310 in the storage device 301. The authentication program 310 is a program performing the user authentication for a client attempting to couple (the client blade 100 or the client terminal 200).

The client terminal 200 and the application distribution server 300 may be configured to be coupled to the company network 145 although being configured to be coupled to the external network 140 in FIG. 1.

The application distribution server 300 reads out a program 302 stored in HDD (hard disc drive) 301, etc., to be equipped with the functions for implementing the present invention onto a RAM 303 and executes the program with a CPU 304 that is a computing device.

The application distribution server 300 includes an input interface 305 such as various keyboards and buttons generally included in a computer apparatus and an output interface 306 such as a display if needed and has a communication interface 307 responsible for giving/receiving data to/from the client blade 100, the client terminal 200, etc.

Functional units configured/retained by the application distribution server 300 based on, for example, the program 302 will be described. The application distribution server 300 includes a service providing part 311 that receives a use request for the application from the client terminal 200 through the external network 140 to allow the client terminal 200 to use the application through the network. The service providing part 311 may receive an authentication request from the client terminal 200, execute the authentication process by checking the authentication information contained in the authentication request against the authentication data in the storage device 301 to generate an authentication result, and transmit the authentication result to the client terminal 200.

The service providing part 311 may receive an acquisition request for the saved data from the client terminal 200, read the saved data from the storage device 301, and transmit the saved data to the client terminal 200 through the external network 140.

The parts 110 to 113, 210 to 212, 310, etc., in the client blade 100, the client terminal 200, and the application distribution server 300 making up the application distribution control system 10 described above may be implemented as hardware or may be implemented as programs stored in suitable storage devices such as memory and HDD (Hard Disk Drive). In this case, the CPUs of the apparatuses read the programs from the storage devices onto the memories for execution in accordance with the execution of the programs.

The networks 140 and 145 may be employed as various networks such as ATM lines, private lines, WAN (Wide Area Network), electric light line networks, wireless networks, public lines, portable telephone networks along with the Internet and LAN. Using a virtual private network technology such as VPN (Virtual Private Network) is preferable since communications with higher security may be established when using the Internet.

Data Configuration Examples

Configurations of various data utilized by the apparatuses making up the application distribution control system 10 of the embodiment will then be described. FIGS. 5A to 5C depict exemplary data configurations of use state data 125 (FIG. 5A), security policy data 126 (FIG. 5B), and authentication information 127 (FIG. 5C) according to the embodiment.

The use state data 125 are data of application use state in the client blade 100 when an application in the application distribution server 300 is used from the client blade 100. The use state data in an example of the embodiment are data about a state of the browser 112 used for utilizing the application. An example of the data configuration may be assumed to be a data set having items such as a window size 41 of the browser 112 (the current window size of the browser 112), cookie information 42, a proxy server address 43, tab state information 44 (state information of tabs retaining a state of opening a plurality of pages in the browser 112, consisting of information of tab numbers and URLs), a bookmark 45 (URL information of web sites), a URL history 46 (URL information of web sites browsed in the past with the browser by a user), and cache data 47 (contents of web sites browsed in the past with the browser by a user), for example.

The cookie information 42 is generally information used for maintaining a session between a web server (the application distribution server 300) and a browser. The cookie information is transmitted from the web server to the browser when the browser accesses the web server for the first time. When the browser accesses the web server next time, the cookie information is transmitted from the browser to the web server and the session may be maintained next time or later. The cookie information 42 of the embodiment is assumed to include temporary cookie retained temporarily on a volatile memory (such as RAM) and permanent cookie saved on a nonvolatile storage device (such as HDD) such as HDD. The cookie information 42 may be assumed to be all or some of the pieces of cookie information retained by the browser and may be acquired only the cookie information for the application distribution server 300 accessed at the stage of starting a takeover process (process of shifting from the application utilization through the client blade 100 to the direct coupling between the application distribution server 300 and the client terminal 200), for example.

The proxy server address 43 is information specifying a proxy server of the browser. The access from the client blade 100 coupled to the company network 145 to the application distribution server 300 is generally performed through the proxy server 410. On the other hand, the access from the client terminal 200 to the application distribution server 300 may be performed through the proxy server 410 or may directly be performed without going through the proxy server 410. In the case of direct access, the proxy server address 43 is not used.

The browser state information (use state data) transmitted from the client blade 100 to the client terminal 200 is made up of all or some of the above items and the transmitting client blade 100 may delete the state information from the storage device 101 after the state information is transmitted to the client terminal 200. Similarly, the browser state information transmitted from the client terminal 200 to the client blade 100 is made up of all or some of the above items and the transmitting client terminal 200 may delete the stored state information after the state information is transmitted to the client blade 100.

The browser state information serving as the use state information may be assumed to be collected with a method such as collecting from a browser's setting file (stored in a storage device of an apparatus equipped with the browser) or collecting from the OS. If the browser 112 of the client blade 100 and the browser 212 of the client terminal 200 are of different types or different versions, this may be accommodated by mutually converting the state information of the both browsers by predetermined applications included in the storage devices of the client blade 100 and the client terminal 200 (of course, the client blade 100 and the client terminal 200 include data correlating tables, conversion equations, etc., between browser types or versions necessary for the conversion in the storage devices thereof) or message data may be displayed on the output interface to notify a user of inability to execute the takeover process for a portion of the data items.

The security policy data 126 are data of the security policy distributed from the client blade 100 to the client terminal 200. The security policy data may be stored in the client blade 100 or may be stored in the authentication server 420. The security policy data 126 are made up of items of data, for example, an access permitted/inhibited server list 51, data save availability 52, external storage device availability 53, an inhibited browser list 54, antivirus software compatibility 55, and browser background color change propriety 56.

The access permitted/inhibited server list 51 is address information of the application distribution servers 300 permitted or inhibited to be accessed by the client terminal 200. The client terminal 200 refers to the access permitted/inhibited server list 51 to block access from the client terminal 200 to the inhibited servers or allows access to the permitted servers, for example.

The data save availability 52 determines whether data download from the application distribution server 300 may be saved in the client terminal 200 or the client blade 100. The external storage device availability 53 provides data for determining whether data may be written out to an external storage device such as USB memory coupled to the client terminal 20. The inhibited browser list 54 is a list of browsers inhibited to be activated by the client terminal 200. The antivirus software compatibility 55 provides data for checking whether antivirus software is installed in the client terminal 200, whether a virus pattern file is the latest file, etc., and determining whether control is performed for canceling the takeover of the browser state, etc., if not compatible. The browser background color change propriety 56 provides data for determined whether the background color of the browser 212 is changed to display a warning to users if the client terminal 200 accesses a server other than the permitted application distribution servers 300. For example, if the client terminal 200 accesses the unpermitted application distribution server 300, the client terminal 200 uses "red" for the background color of the browser 212 in accordance with this policy or if the client terminal 200 accesses the permitted application distribution server 300, the background color of the browser 212 is changed to "blue". This enables users of the client terminal 200 to visually judge the unintended access to the unpermitted application distribution server 300 and frauds such as phishing may be prevented.

The authentication information 127 is authentication information managed in the storage device of the authentication server 420. The authentication information 127 is a collection of records correlated with data such as available services 62 and authentication information 63 using a user ID 61 as a key. The user ID 61 is identification information uniquely given to each user of the client terminal 200. The available services 62 are services registered for the respective user IDs 61 and permitted to be used by the users (e.g., available applications) Each of the available services 62 is registered and correlated with the authentication information 63. The authentication information 63 is a user ID, a password, an electronic certificate, biometric information, etc. The biometric authentication information is fingerprint authentication information, vein authentication information, iris authentication information, etc., of the user. For example, the authentication server 420 checks biometric authentication information acquired from a biometric authentication device not shown disposed on the client terminal 200 against the biometric authentication information of the user registered in the authentication server 420 to return a result of success and failure of the authentication.

The authentication server 420 may generate the authentication information 63 in a form of a script or an executable program. A script or an executable program containing the authentication information 63 is executed in the client terminal 200 or the client blade 100 to execute authentication for the application distribution server 300. Generating a script or an executable program to execute authentication eliminates a need to directly handle the authentication information by the client blade 100. Although the authentication information 63 is configured to be managed in the authentication server 420 in the embodiment, the authentication information 63 may be managed in the client blade 100.

Process Flow Example 1

Actual procedures of the application distribution control method of the embodiment will hereinafter be described with reference to the figures. Various operations corresponding to the application distribution control method described below are implemented by a program read and executed in the respective RAMs, etc., of the client blade 100 that is an information processing apparatus, the client terminal 200, and the application distribution server 300 making up the application distribution control system 10. The program is made up of codes for executing the various operations described below.

Figure 6:
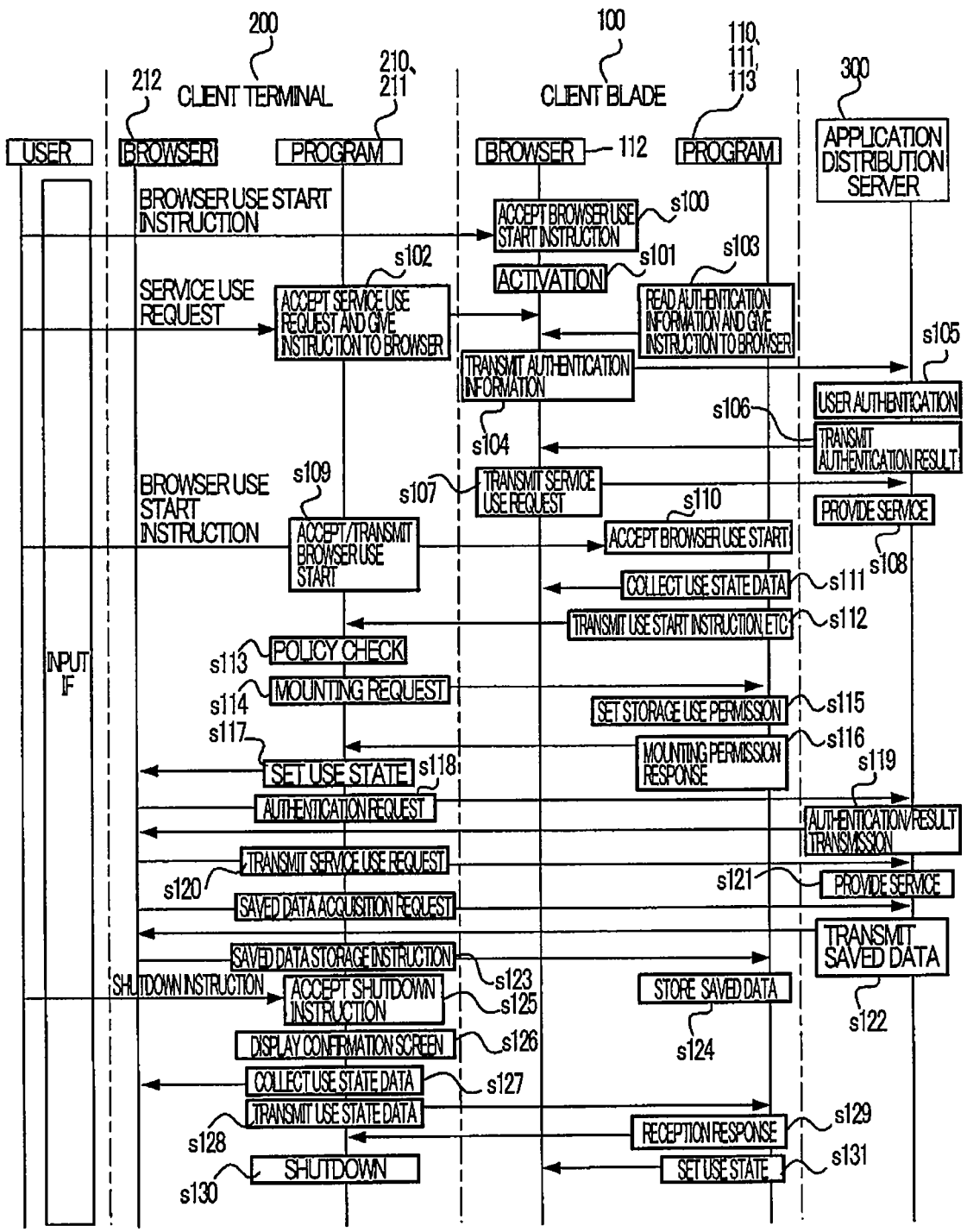
FIG. 6 is a diagram of a process flow example 1 of the application distribution control method according to the embodiment.

FIG. 6 depicts a process flow example 1 of the application distribution control method according to the embodiment. Although not shown, it is assumed that the client terminal 200 activates the remote client program 270 to remotely operate the client blade 100 in conjunction with the remote server program 170 of the client blade 100 in the previous step of this process flow. The encrypted communication may be established between the gateway server 400 and the client terminal 200 or the encrypted communication may be established between the client blade 100 and the client terminal 200.

After the activation of the client terminal 200, the parts 210 to 212 are activated as needed. Similarly, the parts 110 to 113 are activated as needed in the client blade 100 after the activation of the client blade 100. For example, (any one of) the parts of the client blade 100 and (any one of) the parts of the client terminal 200 may always monitor whether the client terminal 200 starts remotely operating the client blade 100 and the start of the communication between the parts of the client blade 100 and the client terminal 200 may be triggered by starting of the remote operation. This communication may utilize a communication channel for the remote operation or the parts may generate a new communication channel. If a new communication channel is generated, the part performs authentication using common keys, PKI authentication, password authentication through manual input by users, etc., for each other at the start of communication to start the communication after mutually authenticating that the means (applications) are correct.

The flow example 1 of FIG. 6 will describe a switching process executed by the client terminal 200 to receive an application directly provided from the application distribution server 300 during the remote operation of the client blade 100 from the client terminal 200. First, a user gives an instruction for starting use of the browser 112 of the client blade 100 through the input interface 205 of the client terminal 200. This instruction is accepted by the client blade 100 and the browser 112 is activated (s100 and s101).

The client terminal 200 accepts a user's service use request (use request for the application function provided by the application distribution server 300) through the input interface 205 and gives this instruction to the browser 112 (s102). Assuming that the browser 112 requests authentication information for a service X (provision of an application X) while monitoring the browser 112, the client blade 100 reads and transmits the corresponding authentication information 127 from the storage device 101 to the browser 112 (s103). The authentication information 127 may preliminarily be acquired by the client blade 100 from the authentication server 420 or may preliminarily be input by the user through the input interface 105 and retained in the storage device 101 by the client blade 100.

The browser 112 then transmits the authentication information 127 to the application distribution server 300 (s104). The application distribution server 300 performs user authentication based on the authentication information 127 (s105). The user authentication is performed by the authentication program 310 checking the authentication information 127 against a user ID registered in the application distribution server 300 and a user password correlated with the user ID or performed with PKI authentication, etc.

The application distribution server 300 transmits the authentication result of the user authentication to the browser 112 of the client blade 100 (s106). If the authentication result has no problem, i.e., if the authenticity of the user is verified, the browser 112 transmits a service use request to the application distribution server 300 (s107). The service providing part 311 of the application distribution server 300 performs the provision of the application X to the client blade 100 (s108).

The client terminal 200 accepts the input of the use start instruction for the browser 212 of the client blade 100 from the user through the input interface 205 and transmits this instruction to the client blade 100 (s109). The use start instruction for the browser 212 is an instruction for starting a process of switching such that the service X (application X) used through the browser 112 on the client blade 100 is used through the browser 212 on the client terminal 200. This start instruction for the switching process may directly be given by the user as above or may be given by the client blade 100. The switching start instruction by the client blade 100 is executed, for example, when a predetermined application of the client blade 100 detects a network delay between the client terminal 200 and the client blade 100 and the network delay turns to a certain value (stored in the storage device 101) or more. Alternatively, the instruction is executed in such a case that a predetermined application of the client blade 100 detects a moving image reproduction process having a drawing load (e.g., a load of the CPU 104, an occupancy rate of the RAM 103) higher than a predetermined value (stored in the storage device 101).

Figure 9:
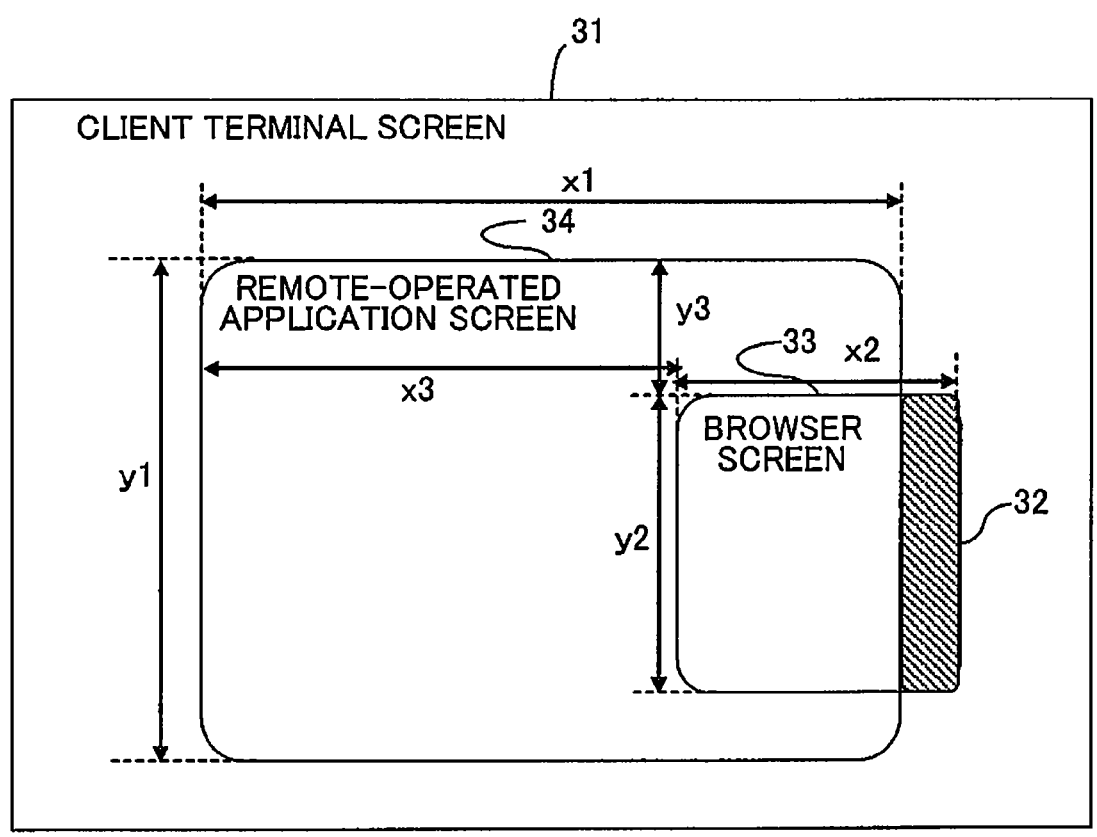
FIG. 9 is a diagram of an exemplary screen according to the embodiment.

It may be assumed that the switching start instruction is manually given by a user in some situations. FIG. 9 depicts an exemplary screen of the client terminal 200 when the switching process is started by a manual operation. In FIG. 9, a client terminal screen 31 includes a portion 32 of a browser screen, a browser screen 33, and a remote-operated application screen 34.

The client terminal screen 31 is a screen displayed on the display device of the client terminal 200; the remote-operated application screen 34 is a screen (e.g., a desktop screen of the client blade 100 having the application distributed) of a remote-operated application (e.g., the application distributed from the application distribution server 300 to the client blade 100); and the browser screen 33 is a screen of the browser 112 (a screen while using the application distributed from the application distribution server 300).

The portion 32 of the browser screen is an unseen portion of the browser screen 33 protruded from the remote-operated application screen 34. The remote-operated application screen 34 is displayed within the client terminal screen 31. The browser screen 33 is displayed within the remote-operated application screen 34.

If the user manually gives an instruction for causing the browser 212 of the client terminal 200 to take over the state of the browser 112 operated on the client blade 100, i.e., the switching start instruction, the drag-and-drop operation is performed with the use of a mouse, etc., to move the browser screen 33 in the remote-operated application screen 34 out of the remote-operated application screen 34. In this case, the client blade 100 calculates an area of the portion 32 of the browser screen and monitors whether the area of the portion 32 of the browser screen reaches a certain rate value (stored in the storage device 101) or more of the area of the browser screen 33. When calculating the area, for example, browser window size history data may be stored in the storage device 101 and, if the window size is reduced in a predetermined time, a change in the size may be calculated as the area of the portion of the browser screen. Specifically, assuming an area x2×y2 of the browser screen 33, an area x1×y1 of the remote-operated application screen 34, and a coordinate position (x3, y3) of the browser screen 33 within the remote-operated application screen 34, an area of the portion 32 of the browser screen is (x2−(x1−x3))×y2 as apparent from the example of FIG. 9. If this area becomes greater than 30% of the entire area of the browser screen, the switching start instruction is triggered.

If an area of the portion 32 of the browser screen reaches a certain rate value or more of the area of the browser screen 33, the client blade 100 gives the switching start instruction.

Steps after above step s109 will then be described. The data collecting part 110 of the client blade 100 collects and stores into the RAM 103 the data of the use state of the browser 112 in the client blade 100 (e.g., at least one of a window size, a cookie, a proxy server address, a tab state, a bookmark, a URL history, and cache data) when the application (e.g., application X) of the application distribution server 300 is used from the client blade 100 (s110). The data collecting part 110 reads and stores the authentication information 127 used when the application X of the application distribution server 300 is used from the client blade 100 along with the use state data from the authentication server 420 and the storage device 101 of the client blade 100 into the RAM 103. The data collecting part 110 reads from the storage device 101 of the client blade 100 and stores into the RAM 103 the security policy data 126 when the application X of the application distribution server 300 is used from the client blade 100.

The data moving part 111 of the client blade 100 reads and transmits the use state data 125, the security policy data 126, and the authentication information 127 from the RAM 103 to the client terminal 200 through the external network 140 along with the use start instruction for the browser 212 (s111).

On the other hand, the data setting part 210 (or the request transmitting part 211) of the client terminal 200 performs a policy check of the client terminal 200 using the security policy data 126 (s112). If data save into the client blade 100 is permitted in the security policy data 126, the data setting part 210 (or the request transmitting part 211) transmits a storage mounting request to the mounting part 113 of the client blade 100 (s113).

On the other hand, the mounting part 113 of the client blade 100 receives the storage mounting request, which is a use request for the storage device 101, from the client terminal 200 to set the use permission for the storage device 101 to the client terminal 200 (s114). The mounting part 113 of the client blade 100 transmits a mounting permission response to the data setting part 210 (or the request transmitting part 211) (s115). The storage mounting is a process of enabling the data save from the client terminal 200 into the storage such as the storage device 101, etc., of the client blade 100.

The data setting part 210 of the client terminal 200 receives the use state data 125, the security policy data 126, and the authentication information 127 from the client blade 100 to set the use state of the browser 212 in the client terminal 200 in accordance with the use state data 125 (s116). The data setting part 210 stores the security policy data into the storage device (e.g., the RAM 203).

The request transmitting part 211 (or the browser 212) transmits the authentication information containing the authentication information 127 received from the client blade 100 to the application distribution server 300 (s117). On the other hand, the service providing part 311 of the application distribution server 300 receives the authentication request, executes the authentication process by checking the authentication information contained in the authentication request with the authentication data in the storage device 301 to generate an authentication result, and transmits the authentication result to the client terminal 200 (s118).

The request transmitting part 211 of the client terminal 200 receives the authentication result from the application distribution server 300 and transmits a use request for the service X to the application distribution server 300 if the authentication result indicates successful authentication (s119). The request transmitting part 211 may read the security policy data 126 from the storage device to determine whether (URL, etc., of) the application distribution server 300 is prescribed in the security policy data 126 and may transmit the use request for the application X to the application distribution server 300 prescribed in the security policy data 126.

On the other hand, the service providing part 311 of the application distribution server 300 receives the use request for the service X from the client terminal 200 through the external network 140 and allows the client terminal 200 to use the application X corresponding to the service X through the network (s120).

The request transmitting part 211 of the client terminal 200 transmits an acquisition request for saved data associated with the use of the service X to the application distributing server 300 (s121). On the other hand, the service providing part 311 of the application distribution server 300 receives the acquisition request for the saved data from the client terminal 200, reads the saved data from the storage device 301, and transmits the saved data to the client terminal 200 through the external network 140 (s122).

The request transmitting part 211 of the client terminal 200 acquires the saved data from the application distributing server 300 and gives a storage instruction for the saved data to the storage device 101 of the client blade 100 (s123).

On the other hand, the mounting part 113 of the client blade 100 receives the storage instruction for the saved data from the client terminal 200 and stores the saved data into the storage device 101 (s124). After the process at step S124, the request transmitting part 211 of the client terminal 200 may check whether the saved data are left in the storage device of the client terminal 200 and may delete the corresponding date so as not to leave the data.

If the client terminal 200 provided with the service X receives a terminal shutdown instruction through the input interface 205 of detects the start of shutdown (s125), the client terminal 200 displays a confirmation screen for checking whether a browser state takeover process is necessary (screen data are stored into the storage apparatus 101) on the output interface 205 (s126). If a user makes a selection to execute the takeover process, the client terminal 200 accepts the selection event through the input interface 205 to collect the browser state information (use state data) from the browser 212 using the service X (s127). The collection of the use state data are executed by a program (included in the client terminal 200) having the same function as the data collecting part 110 of the client blade 100.

The client terminal 200 transmits the browser state information to the client blade 100 (s128). On the other hand, the client blade 100 correspondingly transmits a reception response to the client terminal 200 (s129). The client terminal 200 then performs the shutdown of the terminal (s130). The client blade 100 transmits the browser state information to the browser 112 and executes an application process of the browser state information (s131). If the browser 112 is not activated when step s130 is executed, the client blade 100 may store the browser state information into the storage device 101 and may detect the timing of the next activation of the browser 112 to apply the browser state information.

The network loads between the client terminal 200 and the client blade 100 and the process loads of the client blade 100 may be reduced and the operating efficiency for users may be improved by taking over the browser state information, etc., from the client blade 100 to the client terminal 200 to provide services as described above. The effect of preventing leakage, loss, etc., of data is achieved by enabling data to be stored in the client blade 100 regardless of whether the execution location of the browser used by users is the client blade or the client terminal.

Although it is assumed that the application distribution server 300 is used while the client blade 100 is remotely operated from the client terminal 200, for example, if a list of application distribution servers 300 having a heavy image drawing process is preliminarily retained in the client blade 100 of the client terminal 200 and if a use request for these application distribution servers 300, the client terminal 200 may directly couple to the application distribution server 300 from the beginning (without executing the switching process). In such a case, seamless coupling from the client terminal 200 to the application distribution server 300 may be achieved by executing the takeover process of the browser state information as above.

Process Flow Example 2

Description will then be made of the procedure when the authentication function is added to the proxy server 410 and the authentication for services is performed by the proxy server 410 as a substitute. In this case, the proxy server 410 relaying the access from the client blade 100 or the client terminal 200 to the application distribution server 300 performs the authentication procedure necessary for accessing from the client blade 100 or the client terminal 200 to the application distribution server 300 and maintains the session between the client blade 100 or the client terminal 200 and the application distribution server 300 as a substitute.

Figure 7:
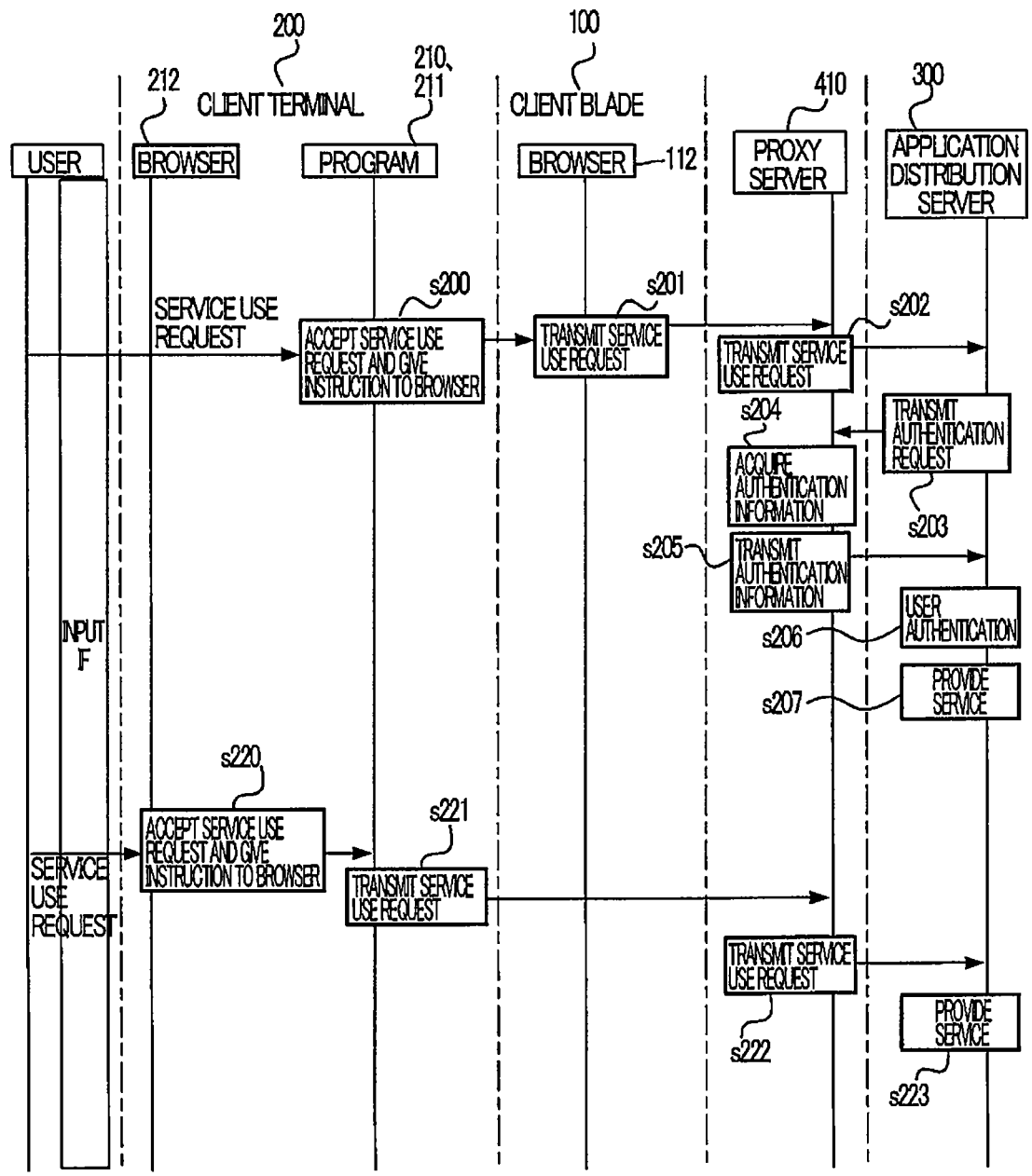
FIG. 7 is a diagram of a process flow example 2 of the application distribution control method according to the embodiment.

FIG. 7 depicts a process flow example 2 of the application distribution control method according to the embodiment. The client terminal 200 accepts a service use request from a user through the input interface 105 and the client blade 100 receives and transmits this request to the browser 112 (s200). On the other hand, the browser 112 transmits the service use request to the proxy server 410 (s201).

The proxy server 410 accepts the service use request and transmits the service use request to the application distribution server 300 (s202). The authentication program of the application distribution server 300 transmits a user authentication request to the proxy server 410 for the authentication information acquisition process in the proxy server 410 on receipt of the service use request (s203).

On the other hand, the proxy server 410 receives the user authentication request to execute the authentication information acquisition process for the user (s204). The proxy server 410 may make an authentication information request to the authentication server 420 using the user ID contained in the service use request as a key to acquire the information or may request and acquire input from the user through the input interface of the proxy server 410 before s204.

The proxy server 410 transmits the authentication information of the user to the application distribution server 300 (s205). The authentication program 310 of the application distribution server 300 executes a user authentication process (s206) and if a result of the authentication process has no problem, the service providing part 311 provides the service to the client blade 100 (s207).

While maintaining the session between the proxy server 410 and the application distribution server 300 for the service provision, the client terminal 200 accepts the service use request through the input interface 205 and transmits the request to the browser 212 (s220). In this case, the browser 212 transmits the service use request (containing the user ID) to the proxy server 410 (s221). The proxy server 410 receives and transmits the service use request from the browser 212 to the application distribution server 300 (s222). The service providing part 311 of the application distribution server 300 provides the service through the proxy server 410 to the client terminal 200 of the user already subjected to the alternative authentication process by the proxy server 410 (s223).

If the proxy server 410 with the authentication function added as above is utilized, the proxy server 410 receives the service use request from the browser 212 and the browser 112 and performs the authentication in place of the application distribution server 300. The proxy serve 410 retains cookie information, etc., in the storage device for maintaining the session with the application distribution server 300. The client blade may be equipped with the function of the proxy server 410.

Other Exemplary System Configurations

Figure 8:
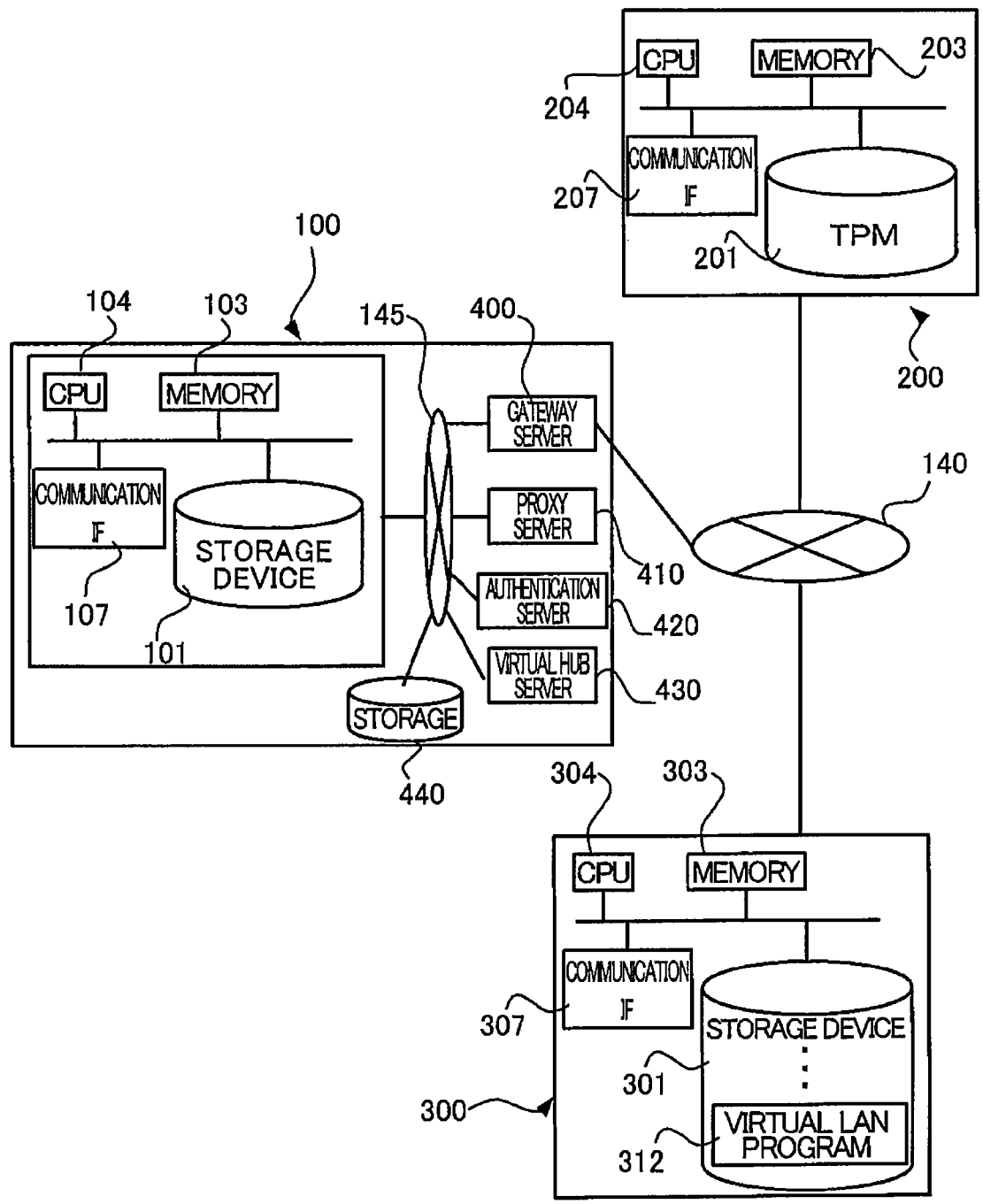
FIG. 8 is a diagram of an exemplary network configuration of an application distribution control system according to another embodiment.

Envisioned system configurations other than the above example will then be considered. FIG. 8 depicts a network configuration of an application distribution control system according to another embodiment. As shown in FIG. 8, in this exemplary configuration, a virtual hub server 430 and storage 440 are coupled to the company network 145 and the application distribution server 300 includes a virtual LAN program 312. The virtual LAN program 312 is a program that establishes virtual LAN in conjunction with the virtual hub server 430 (existing virtual LAN software may be employed).

The gateway server 400 of this configuration forms DMZ (DeMilitarized Zone) as an intermediate zone between the external network 140 and the company network 145. The DMZ is provided with the proxy server 410 and the virtual hub server 430, allows passage through a certain port from the outside, and enables communication through HTTP, the SSL protocol, etc.

The application distribution server 300, the authentication server 420, and the storage 440 couple to the virtual hub server 430 to form virtual LAN. The application distribution server 300 and the virtual hub server 430 are coupled through the SSL protocol and may be used without considerably changing the setting of the gateway server 400.

This enables the authentication program 310 of the application distribution server 300 to allow the authentication server 420 to perform the user authentication as a substitute and to store data into the storage 440 in conjunction with the authentication server 420 and the storage 440. Therefore, data and important information such as authentication information may be stored in a server within a company instead of storing data and information in the outside application distribution server 300.

Although the virtual hub server 430 is configured to be disposed in the DMZ in FIG. 8, the virtual hub server 430 may be disposed on the external network as long as the virtual hub server 430 is communicable from the application distribution server 300 and the authentication server 420.

According to the embodiment, the improvement of operating efficiency for users, etc., may be achieved by reducing network loads and avoiding load concentration on a server due to the screen transfer mode in the server-based computing as above. The user authentication of the SaaS and ASP servers may easily be linked with a company's user authentication mechanism.

Although the present invention has specifically been described based on the embodiment, the present invention is not limited to the embodiment and may variously be modified without departing from the spirit thereof.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. An application use system comprising:
a thin client system including:
a client terminal; and
an information processing server; and
an application server that allows another apparatus to use an application,
the client terminal, the information processing server, and the application server being coupled with a network,
the information processing server comprising a processor configured to execute a program stored in a memory to perform:
a first application use function to access the application server in accordance with user input information received from the client terminal and to use the application;
a screen information transmitting function to transmit screen information indicative of a result of use of the application to the client terminal;
a data collecting function to collect and store setting data for the first application use function when the first application use function uses the application in the application server in accordance with the user input information received from the client terminal; and
a data moving function to move the collected setting data to the client terminal;
the client terminal comprising a processor configured to execute a program stored in a memory to perform:
a user information transmitting function to transmit to the information processing server, the user input information through the network when the information processing server accesses the application server to use the application;
a second application use function to access the application server in accordance with the received user input information and to use the application, the second application use function transmitting a use request for the application to the application server through a session established between the client terminal and the application server in accordance with the setting data, the session being not routed through the information processing server; and
a data setting function to receive the setting data from the information processing server and set the setting data for the second application use function to cause the second application use function to inherit the setting of the first application use function in the information processing server when the information processing server uses the application in the application server; and
the application server comprising a processor configured to execute a program stored in a memory to perform a service providing function to receive, from the second application use function of the client terminal, the use request for the application in accordance with the setting data moved from the information processing server to the client terminal and to allow the second application use function of the client terminal to use the application through the session established between the client terminal and the application server in accordance with the setting data, the service providing function also allowing the first application use function of the information processing server to use the application in response to an access from the first application use function of the information processing server; wherein:
the data collecting function of the information processing server reads and stores authentication information from a storage device of the information processing server into a memory, the authentication information being used when the application in the application server is used from the information processing server;

the data moving function of the information processing server reads and moves authentication information from a memory to the client terminal through the network;

the second application use function of the client terminal receives the authentication information from the information processing server, transmits an authentication request containing the authentication information to the application server, receives an authentication result from the application server depending on the authentication request, and transmits the use request for the application if the authentication result indicates successful authentication; and the service providing function of the application server receives the authentication request from the client terminal, executes an authentication process by checking the authentication information contained in the authentication request against authentication data in the storage device to generate an authentication result, and transmits the authentication result to the client terminal.

2. The application use system of claim 1, wherein:

the data collecting function of the information processing server collects, as the setting data, from a storage device of the information processing server, at least one of a window size, information used for maintaining a session between the application server and the client terminal, a proxy server address, a tab state, a bookmark, a URL history, and cache data of the first application use function when the application in the application server is used from the information processing server; and the data setting function of the client terminal receives the setting data from the information processing server and sets, at least one of a window size, information used for maintaining a session between the application server and the client terminal, a proxy server address, a tab state, a bookmark, a URL history, and cache data for the second application use function of the client terminal in accordance with the setting data.

3. The application use system of claim 1, wherein:

the data collecting function of the information processing server reads and stores security policy data from a storage device of the information processing server into a memory, the security policy data being used when the application in the application server is used from the information processing server;

the data moving function of the information processing server reads and moves the security policy data from the memory to the client terminal through the network;

the data setting function of the client terminal receives and stores the security policy data from the information processing server into the storage device; and the second application use function of the client terminal reads the security policy data from the storage device, determines whether the application server is prescribed in the security policy data, and transmits the use request for the application to the application server prescribed in the security policy data.

4. The application use system of claim 3, wherein:

the security policy data contains information of availability of the storage device of the information processing server from the client terminal;

the second application use function of the client terminal reads the security policy data from the storage device to determine whether the security policy data prescribes that the storage device of the information processing server is available, transmits a use request for the storage device to the information processing server if the storage device of the information processing server is available, transmits an acquisition request for saved data associated with the use of the application to the application server, and instructs the information processing server to store the saved data acquired from the application server into the storage device;

the information processing server includes a mounting function that receives a use request for the storage device from the client terminal to execute setting of use permission for the storage device to the client terminal and that receives a storage instruction for the saved data from the client terminal to store the saved data into the storage device; and the service providing function of the application server receives the acquisition request for the saved data from the client terminal, reads the saved data from the storage device, and transmits the saved data to the client terminal through the network.

5. The application use system of claim 1, further comprising a proxy server that relays access from the information processing server or the client terminal to the application server, wherein the proxy server performs, as a substitute, an authentication procedure necessary for accessing from the information processing server or the client terminal to the application server and maintenance of a session between the information processing server or the client terminal and the application server.

6. An application use method executed by a client terminal, an information processing server that makes up a thin client system with the client terminal, and an application server that allows another apparatus to use an application, the client terminal, the information processing server, and the application server being coupled with a network, the method comprising the steps of:

transmitting, by the client terminal, user input information to the information processing server through the network when the information processing server accesses the application server for using the application;

accessing, by the information processing server, the application server in accordance with the user input information received from the client terminal and using the application by the information processing server;

transmitting, by the information processing server, screen information indicative of a result of use of the application to the client terminal;

collecting and storing, by the information processing server, setting data for the information processing server when the information processing server uses the application in the application server in accordance with the user input information received from the client terminal;

moving, by the information processing server, the collected setting data to the client terminal;

receiving, by the client terminal, the setting data from the information processing server to set the setting data in the client terminal to inherit the setting of the information processing server when the information processing server uses the application in the application server;

accessing, by the client terminal, the application server in accordance with the user input information received from a user and using the application to transmit a use request for the application to the application server through a session established between the client terminal and the application server in accordance with the setting data, the session being not routed through the information processing server;

receiving, by the application server, from the client terminal, the use request for the application in accordance with the setting data moved from the information processing server to the client terminal to allow the client terminal to use the application through the session established between the client terminal and the application server in accordance with the setting data; and allowing, by the application server, the first application use function of the information processing server to use the application in response to an access from the information processing server, wherein:

the collecting and storing step reads and stores authentication information from a storage device of the information processing server into a memory, the authentication information being used when the application in the application server is used from the information processing server;

the moving step reads and moves the authentication information from the memory to the client terminal through the network;

the accessing step receives the authentication information from the information processing server, transmits an authentication request containing the authentication information to the application server, receives an authentication result from the application server depending on the authentication request, and transmits the use request for the application if the authentication result indicates successful authentication; and the receiving step receives the authentication request from the client terminal, executes an authentication process by checking the authentication information contained in the authentication request against authentication data in the storage device to generate the authentication result, and transmits the authentication result to the client terminal.

* * * * *